United States Patent
Ebbenga (10) Patent No.: US 12,194,966 B1
(45) Date of Patent: Jan. 14, 2025

(54) LOCK FOR RETRACTABLE WHEELS USED FOR BOAT LIFTS, DOCKS AND OTHER STRUCTURES

(71) Applicant: Mark Ebbenga, Shafer, MN (US)

(72) Inventor: Mark Ebbenga, Shafer, MN (US)

( * ) Notice: Subject to any disclaimer, the term of this patent is extended or adjusted under 35 U.S.C. 154(b) by 525 days.

(21) Appl. No.: 17/514,944

(22) Filed: Oct. 29, 2021

Related U.S. Application Data (60) Provisional application No. 63/108,135, filed on Oct. 30, 2020.

(51) Int. Cl.
*B60T 1/00* (2006.01)
*F16D 63/00* (2006.01)
*B63C 1/00* (2006.01)

(52) U.S. Cl.
CPC ............ *B60T 1/005* (2013.01); *F16D 63/006* (2013.01); *B63C 1/00* (2013.01)

(58) Field of Classification Search
CPC ...... B60T 1/005; F16D 63/006; B60P 3/1033; B62B 5/0461; B62B 5/048; B62B 9/087; B62B 2202/403; B62B 2301/05
See application file for complete search history.

(56) References Cited

U.S. PATENT DOCUMENTS

| | | | | |
|---|---|---|---|---|
| 2,865,031 A * | 12/1958 | Maloney | B63C 13/00 | 280/124.13 |
| 4,706,983 A * | 11/1987 | Griswold | B63C 13/00 | D34/28 |
| 4,850,605 A * | 7/1989 | Ray | B62B 5/0083 | 114/344 |
| 4,985,960 A * | 1/1991 | Zun | B60B 33/0084 | 188/31 |
| 5,765,665 A * | 6/1998 | Cheng | B62B 9/087 | 188/31 |
| 6,032,964 A * | 3/2000 | Capobianco | B62B 5/0083 | 280/47.331 |
| 6,189,478 B1 * | 2/2001 | Myers | B63C 13/00 | 114/344 |
| 6,189,900 B1 * | 2/2001 | MacDonald | B62B 5/0083 | 114/344 |
| 6,341,672 B1 * | 1/2002 | Yang | B62B 9/087 | 280/47.38 |
| 6,557,870 B2 * | 5/2003 | Cheng | B62B 7/04 | 280/47.38 |
| 6,824,155 B1 * | 11/2004 | Heck | B63C 13/00 | 114/344 |
| 7,243,928 B2 * | 7/2007 | Singer | B63C 13/00 | 280/47.331 |

(Continued)

*Primary Examiner* — Jeffrey J Restifo
(74) *Attorney, Agent, or Firm* — Skaar Ulbrich Macari, P.A.

(57) ABSTRACT

A brake assembly for a retractable wheel mechanism for boat lifts and docks can include a contact plate, an axle insert and a brake. The contact plate can include an aperture therethrough so that the contact plate can be disposed on an axle about which a tire rotates. The axle insert can be sized and shaped to fit into a hollow portion of the axle. The brake can be configured to be pivotally secured to the axle insert such that the brake cannot rotate about a rotational axis of the tire while still allowing the brake to pivot perpendicular to a rotational axis of the tire. The brake member can be pivoted from an engaged position that prevents the tire from fully rotating to a disengaged position where the tire can freely rotate.

13 Claims, 9 Drawing Sheets

(56) References Cited

U.S. PATENT DOCUMENTS

| | | | | |
|---|---|---|---|---|
| 7,296,816 | B2* | 11/2007 | Wilnau | B60R 9/08 |
| | | | | 280/47.131 |
| 8,397,877 | B2* | 3/2013 | Mival | F16D 63/006 |
| | | | | 188/31 |
| 8,485,547 | B2* | 7/2013 | Hsu | B62B 7/062 |
| | | | | 280/658 |
| 8,596,421 | B2* | 12/2013 | Park | B60B 33/0049 |
| | | | | 188/19 |
| 9,150,236 | B2* | 10/2015 | Zhang | B62B 9/087 |
| 10,858,029 | B2* | 12/2020 | Bohlman | B62B 1/10 |
| 11,027,803 | B1* | 6/2021 | Brinkley | B63B 34/20 |
| 11,117,604 | B2* | 9/2021 | Kramer | B63B 32/80 |
| 11,318,978 | B2* | 5/2022 | Bastien | B60B 37/04 |
| 11,827,266 | B2* | 11/2023 | Zhu | F16D 63/006 |
| 11,958,314 | B2* | 4/2024 | Huang | B60B 33/025 |
| 12,006,009 | B2* | 6/2024 | Schricker | B63C 13/00 |
| 2002/0195299 | A1* | 12/2002 | Cheng | B62B 9/082 |
| | | | | 280/647 |
| 2006/0151259 | A1* | 7/2006 | Tomasi | B62B 9/082 |
| | | | | 280/647 |
| 2010/0225093 | A1* | 9/2010 | Lin | B62B 3/12 |
| | | | | 280/642 |
| 2018/0304911 | A1* | 10/2018 | Labrecque | B62B 1/12 |
| 2022/0371557 | A1* | 11/2022 | Huang | F16D 63/006 |
| 2023/0219369 | A1* | 7/2023 | Panigot | B62B 1/12 |
| | | | | 280/650 |
| 2023/0227085 | A1* | 7/2023 | Horowitz | B62B 3/007 |
| | | | | 188/9 |

* cited by examiner

LOCK FOR RETRACTABLE WHEELS USED FOR BOAT LIFTS, DOCKS AND OTHER STRUCTURES

PRIORITY

This application claims the benefit of U.S. Provisional Application Ser. No. 63/108,135, filed on Oct. 30, 2020, which is hereby incorporated herein by reference in its entirety.

FIELD

The present invention relates to retractable wheel mechanisms for boat lifts, docks and other structures, and more particularly, a lock mechanism and method for preventing the wheel of the retractable wheel mechanism from rotating.

BACKGROUND

Retractable wheel mechanisms are used for boat lifts and docks. U.S. Pat. No. 8,596,906 describes one such mechanism. The entirety of U.S. Pat. No. 8,596,906 is incorporated by reference herein as part of this application. Such retractable wheel mechanisms comprise a plastic tire mounted to an axle. The plastic tire can also be referred to as a wheel since the terms "wheel" and "tire" are used interchangeably in the art. These tires are intended to remain attached to the assembly even when not being used.

The tires are usually partially or completely submerged under the water when not in use. The movement of the water imparts rotational motion to the tire to cause it to wear down the axle, which is typically formed of an aluminum alloy. In order to prevent the tire rotation and corresponding axle wear, it is desired to prevent the tire from rotating. One such mechanism for preventing the rotation is disclosed in U.S. Pat. No. 8,596,906. However, the rotation-prevention mechanism of this patent requires the tire to be in its fully-retracted position to engage the wheel stop 82. If the tire has too small of a diameter or the tire is not fully retracted, then the tire may still spin and wear down the axle.

Therefore, there remains a need to provide improved tire brake mechanisms and methods for retractable wheel mechanisms used for boat lifts and docks.

SUMMARY

The present invention provides an improved wheel brake mechanism and method of preventing tire rotation for retractable wheel mechanisms used for boat lifts and docks.

In one example, the brake assembly for a retractable wheel mechanism includes a contact plate, axle insert and brake member. The tire is disposed on the axle of the retractable wheel mechanism. The contact plate is placed over the axle so that the axle protrudes through a center aperture in the plate. The axle insert is disposed inside of the hollow interior of the axle and locked to the axle so that it does not spin with respect to the axle. The brake member is then fastened to the insert with a fastener. The brake member can be pivoted from an engaged position that prevents the tire from rotating to a disengaged position where the tire can freely rotate.

In another example, a brake assembly for a retractable wheel mechanism for boat lifts and docks can include a contact plate, an axle insert and a brake. The contact plate can include an aperture therethrough so that the contact plate can be disposed on an axle about which a tire rotates. The axle insert can be sized and shaped to fit into a hollow portion of the axle. The brake can be configured to be pivotally secured to the axle insert such that the brake cannot rotate about a rotational axis of the tire while still allowing the brake to pivot perpendicular to a rotational axis of the tire. The brake member can be pivoted from an engaged position that prevents the tire from fully rotating to a disengaged position where the tire can freely rotate.

The brake can comprise a pivot and a brake body defining a head portion with a gap in the head portion. The pivot can be disposed in the gap so that the pivot spans between opposing sides of the head portion that define the gap. The pivot can be pinned through a longitudinal axis thereof so that the pivot can rotate relative to the brake body.

The brake can be fastened to, or rotationally locked to, the axle insert via the pivot. A fastener can pass through the pivot and into the axle insert. The axle insert can be rotationally locked to the axle via a pin extending radially through the axle and through an aperture extending radially through the insert.

The brake can be Y-shaped. The brake can include a head portion that is pivotally secured to the axle and an opposing tail portion that is not secured to the axle. The tail portion can be an elongated bar.

The brake can be pivoted into an engagement position wherein a tail portion is shaped to engage a portion of the tire such that the tire cannot rotate about the axle.

The brake can be pivoted into an engagement position wherein the tail portion is rotationally captured between two projecting regions on an outer surface of the tire.

The brake can be pivoted into an engagement position wherein a portion of the brake is rotationally captured between adjacent projecting regions on an outer surface of the tire.

The brake can be pivoted into an engagement position wherein a longitudinal axis of the brake is perpendicular to an axis of rotation of the tire.

In a further example, a retractable wheel mechanism for boat lifts and docks can include a sliding support member including an axle attached thereto, a tire that is disposed on the axle, and a brake assembly. The brake assembly can include a brake that is rotationally locked to the axle while allowing the brake to pivot perpendicular to a rotational axis of the tire.

The brake assembly can further include an axle insert that is sized and shaped to fit into a hollow portion of the axle. The axle insert is rotationally locked to the axle. The brake is pivotally fastened to the axle insert.

The brake can include a pivot and a brake body. The brake body defines a head portion with a gap in the head portion. The pivot is disposed in the gap so that the pivot spans between opposing sides of the head portion that define the gap. The pivot is pinned through a longitudinal axis thereof so that the pivot can rotate relative to the brake body.

When the brake is pivoted into an engagement position, a tail portion of the brake can be rotationally captured between two projecting regions on an outer surface of the tire.

When the brake is pivoted into an engagement position, a longitudinal axis of the brake can be perpendicular to an axis of rotation of the tire.

In yet another example, a method of preventing free rotation of a tire about an axle of a retractable wheel mechanism for boat lifts and docks can include pivotally securing a brake to the axle such that the brake cannot rotate about a rotational axis of the tire while still allowing the brake to pivot perpendicular to the rotational axis of the tire and pivoting the brake body into an engagement position to prevent the tire from completing a revolution about the axle.

A portion of the brake body can be rotationally captured between two projecting regions on an outer surface of the tire.

Additional features and benefits are described in the Detailed Description section below and will be apparent from the appended drawings.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Referring to FIGS. 1-9, a brake assembly 100 for a retractable wheel mechanism 200 comprises a contact plate 102, axle insert 104, brake member 106 threaded fastener 108 and fastener retainer (locking nut) 110.

The retractable wheel mechanism 200 includes the aforementioned brake assembly 100, a sliding support member 202, axle 204 and tire 206. The sliding support member 202 slides vertically within the hollow interior of a main support post of the boat lift or dock section. The axle 204 extends outward horizontally from a vertical-facing side surface of the sliding support member 202. The axle 204 can be a hollow tube. The tire 206 is a single-piece plastic tire or wheel that has a center aperture to fit over the axle 204. Of course, the present invention can be adapted to use with other types of tires and wheels, including metal wheels, and wheels with a separate outer rubber tire disposed circumferentially upon the wheel.

Figure 1:
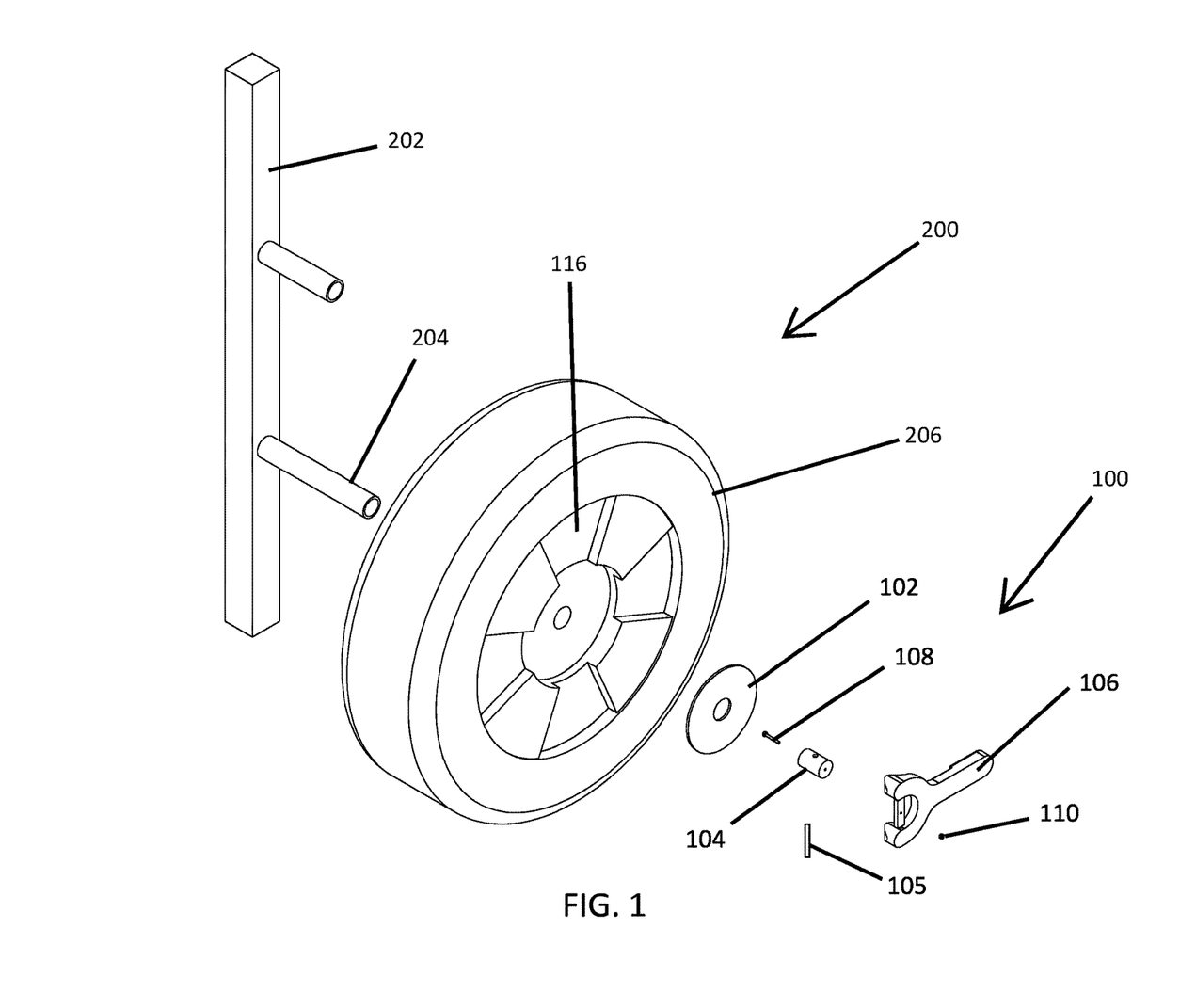
FIG. 1 is an exploded perspective view of a brake assembly for a retractable wheel mechanism according to certain embodiments.
Figure 2:
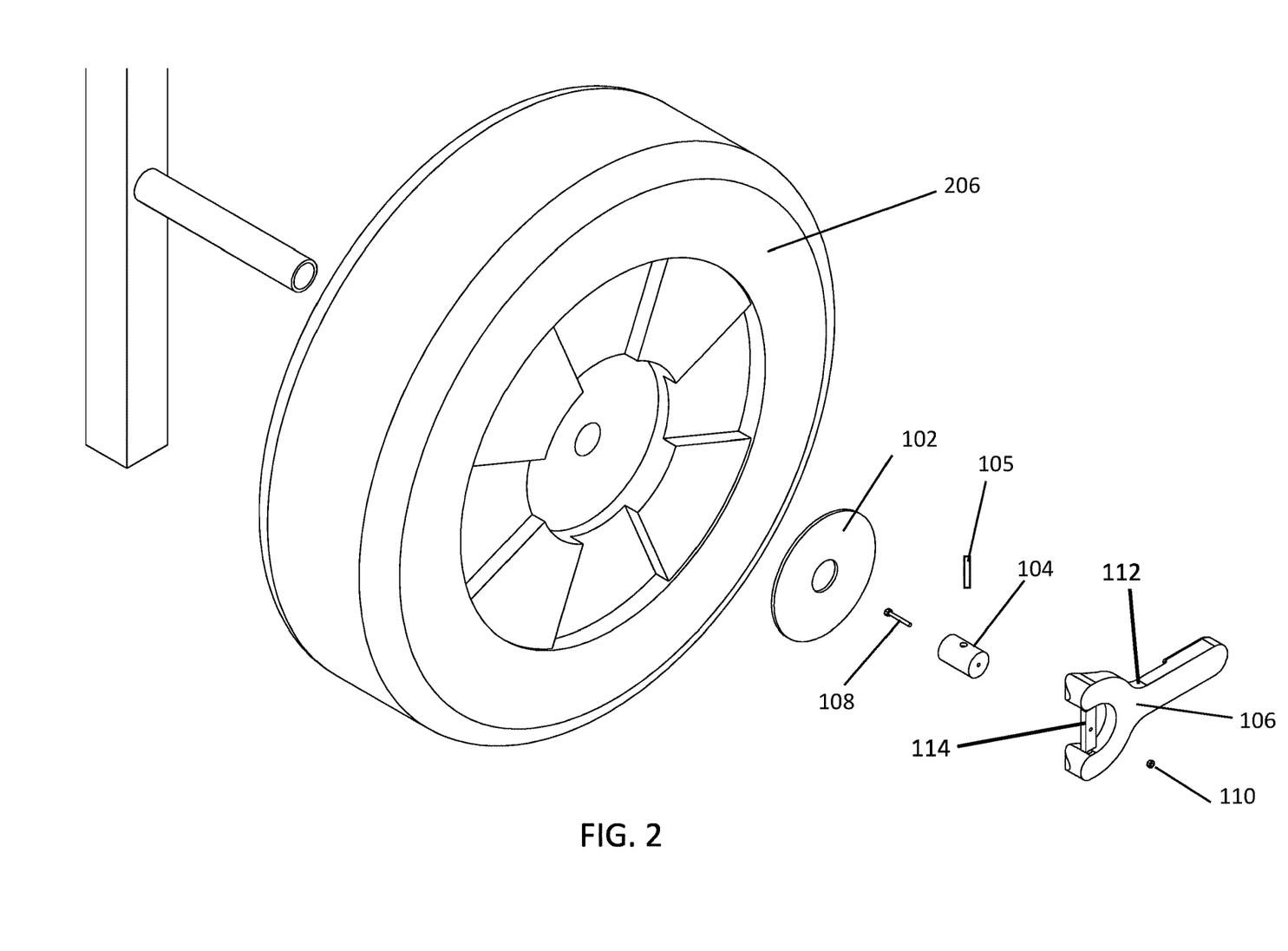
FIG. 2 is another exploded perspective view of a brake assembly for a retractable wheel mechanism according to certain embodiments.
Figure 3:
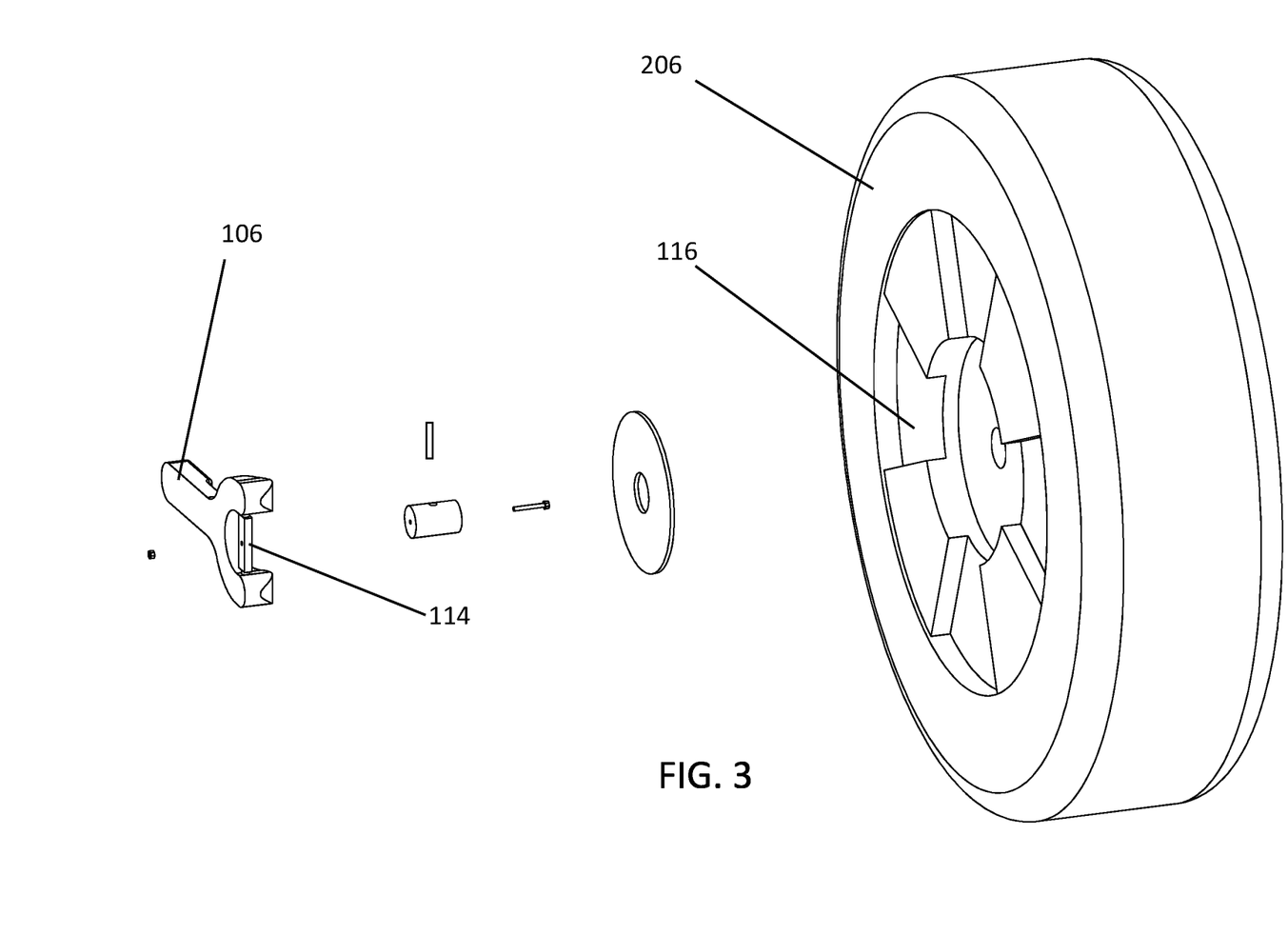
FIG. 3 is a further exploded perspective view of a brake assembly for a retractable wheel mechanism according to certain embodiments.

During assembly, the tire 206 is disposed on the axle 204 so that the wheel 204 can freely rotate. The contact plate 102 is next placed over the axle so that the axle 204 protrudes through a center aperture in the contact plate 102. The axle insert 104 is disposed inside of the hollow interior of the axle 204. The insert 104 is rigidly locked to the axle 204 with a pin 105 so that it does not spin with respect to the axle inner surface. The pin 105 can extend radially through the wall of the axle 204 and through an aperture extending radially through the insert. The brake member 106 is fastened to the insert 104 with the threaded fastener 108 and locking nut 110.

The brake member 106 comprises a generally Y-shaped body 112. The head or diverging portion of the body 112 defines a gap in which a pivot member 114 is disposed. The pivot member 114 spans transversely between the opposing portions of the head. The pivot member 114 is pinned through its longitudinal axis so that it can rotate in an axis perpendicular to the longitudinal axis of the body of the brake member.

Figure 4:
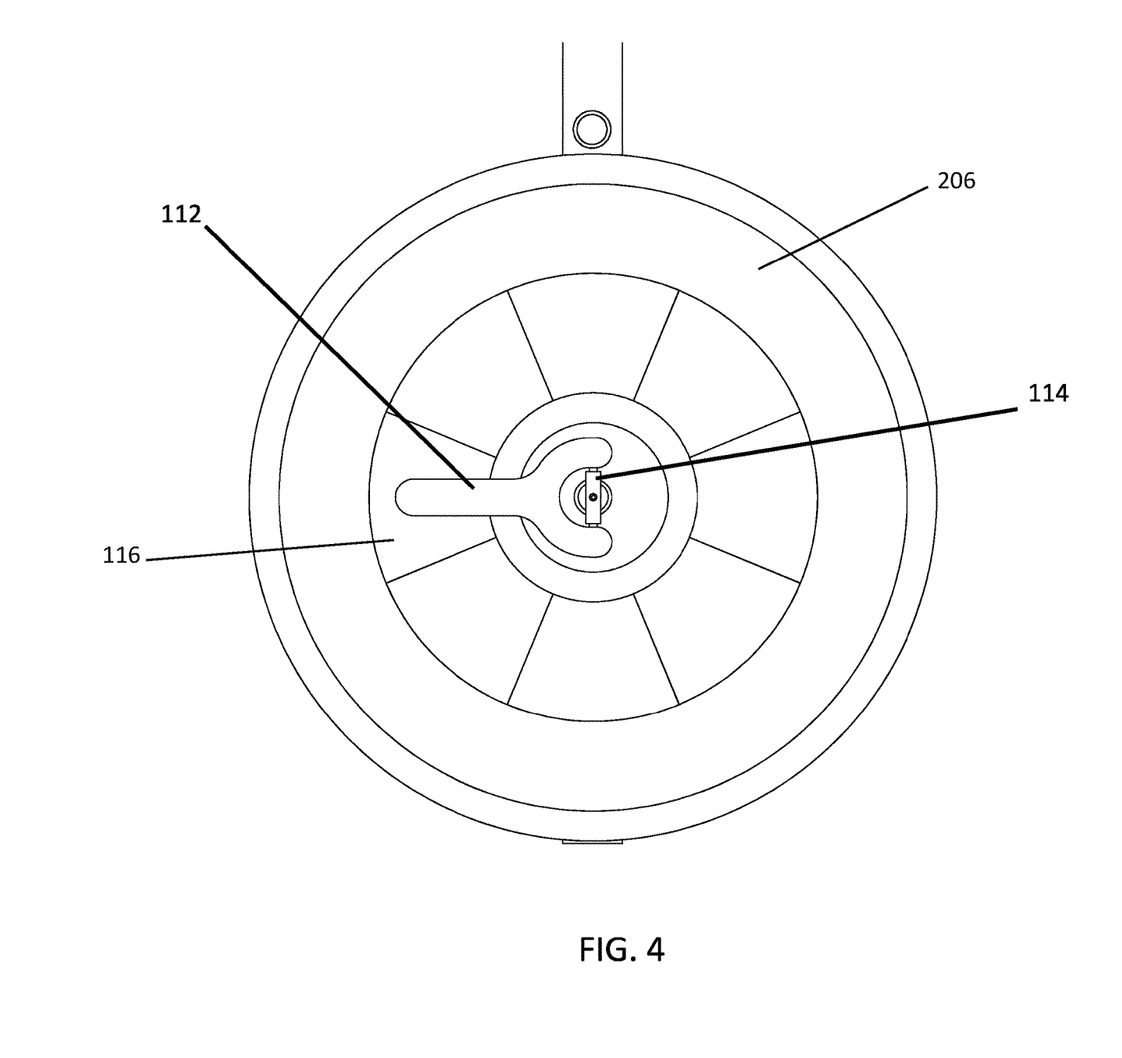
FIG. 4 is a front view of a brake assembly for a retractable wheel mechanism according to certain embodiments.
Figure 5:
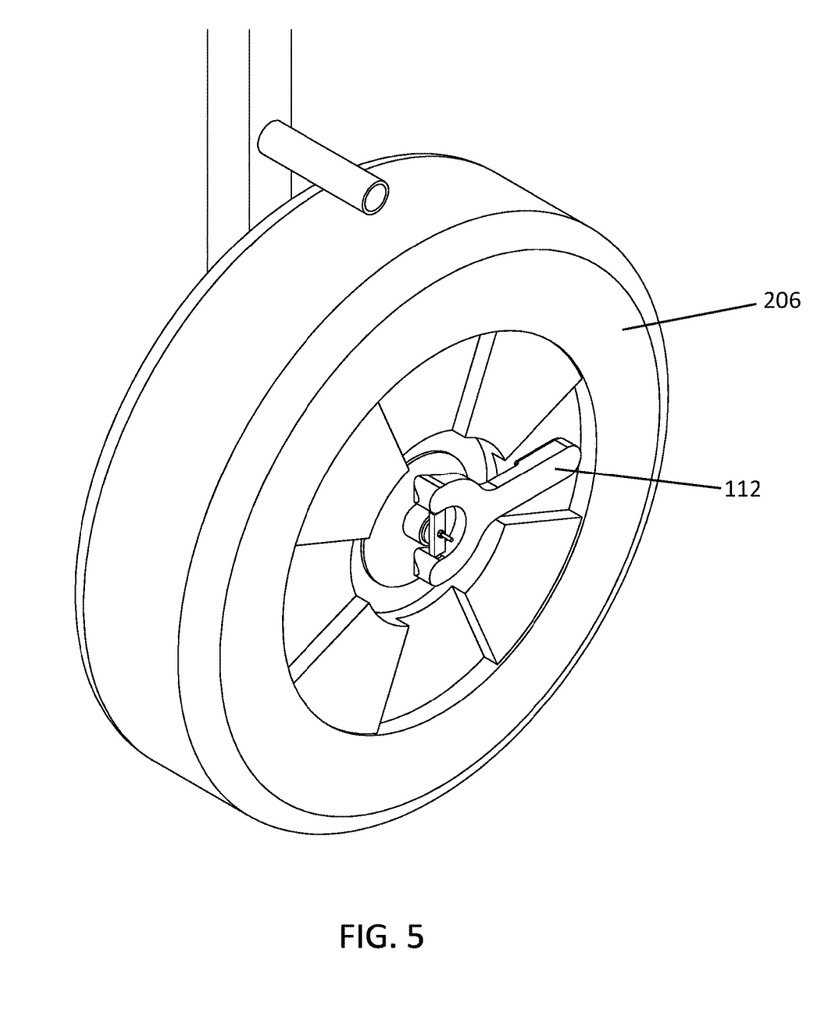
FIG. 5 is a perspective view of a brake assembly for a retractable wheel mechanism according to certain embodiments.
Figure 6:
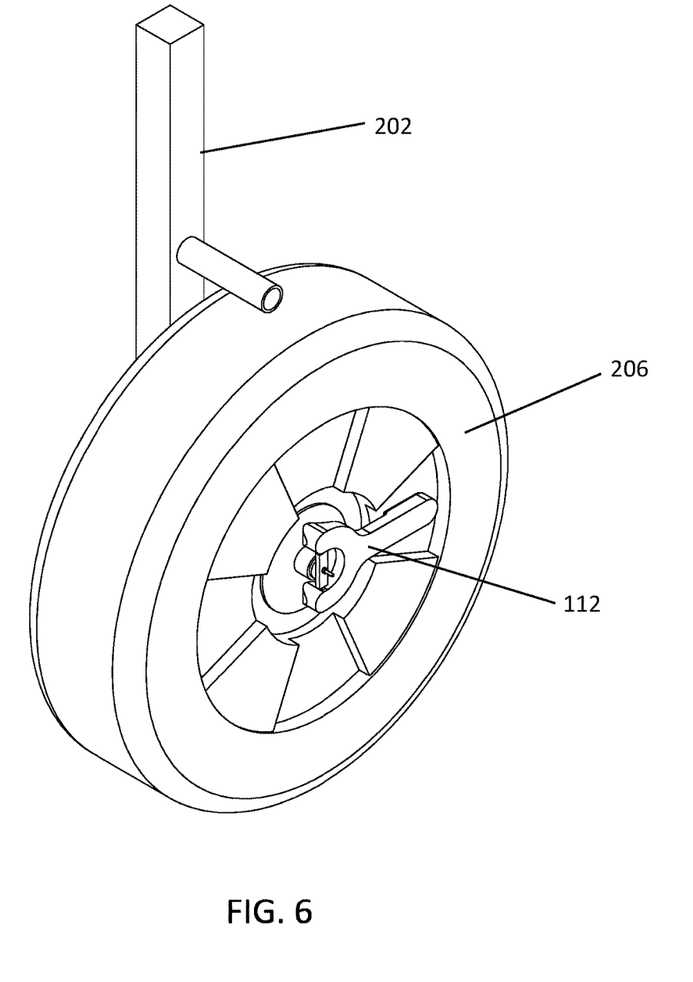
FIG. 6 is another perspective view of a brake assembly for a retractable wheel mechanism according to certain embodiments.

The tail portion of the body 112 of the brake member 106 defines an elongated bar that can engage an engagement feature 116 defined on the face of the tire as shown in FIGS. 4-6. The engagement feature 116 can be a section of the tire's outer surface that is bounded by two portions that project farther outward than the engagement feature. The tail portion of the body 112 is captured in the engagement feature between these projections in the engaged position so that the tire 206 cannot rotate.

In this embodiment, the longitudinal axis of the body 112 extends radially from the center axis of the axle 204. In other words, the longitudinal axis of the body 112 extends in a plane perpendicular to the axis of rotation of the tire 206. In the engaged position, the tire 206 cannot rotate. However, due to clearance reasons, some minor degree of rotation may be permitted while the tire is still considered to be rotationally locked or unable to rotate.

Figure 7:
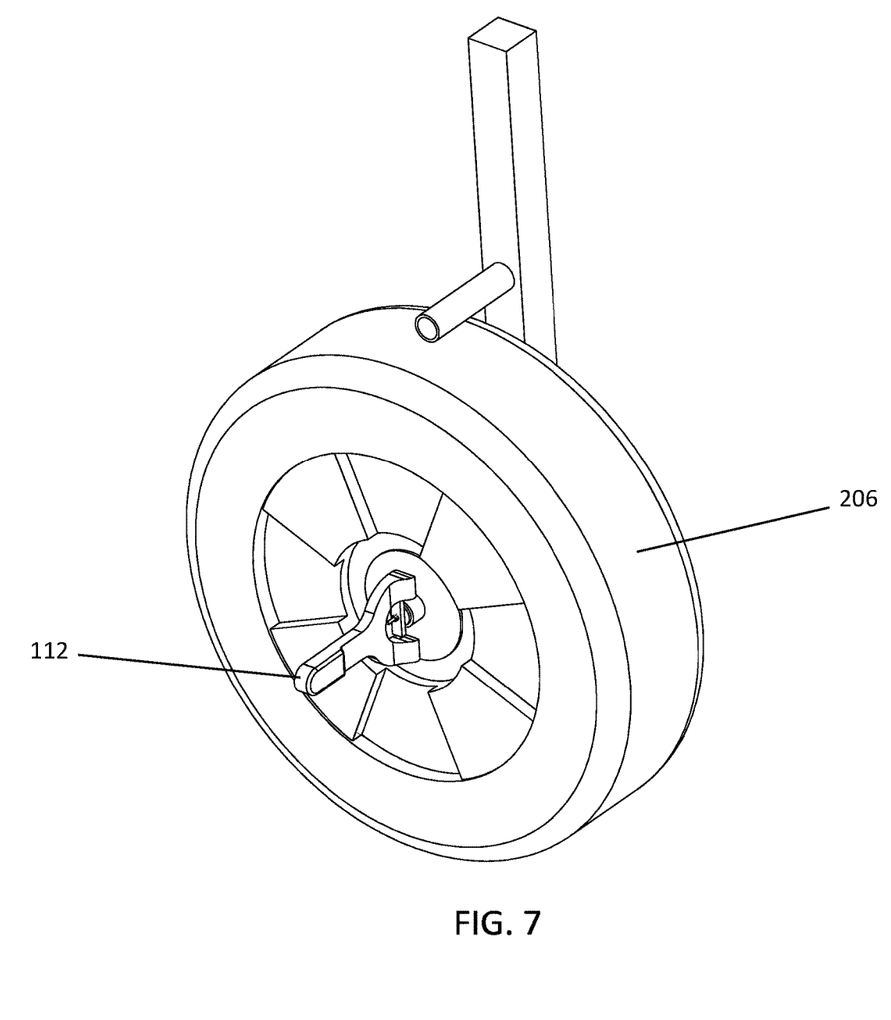
FIG. 7 is a perspective view of a brake assembly for a retractable wheel mechanism according to certain embodiments.
Figure 8:
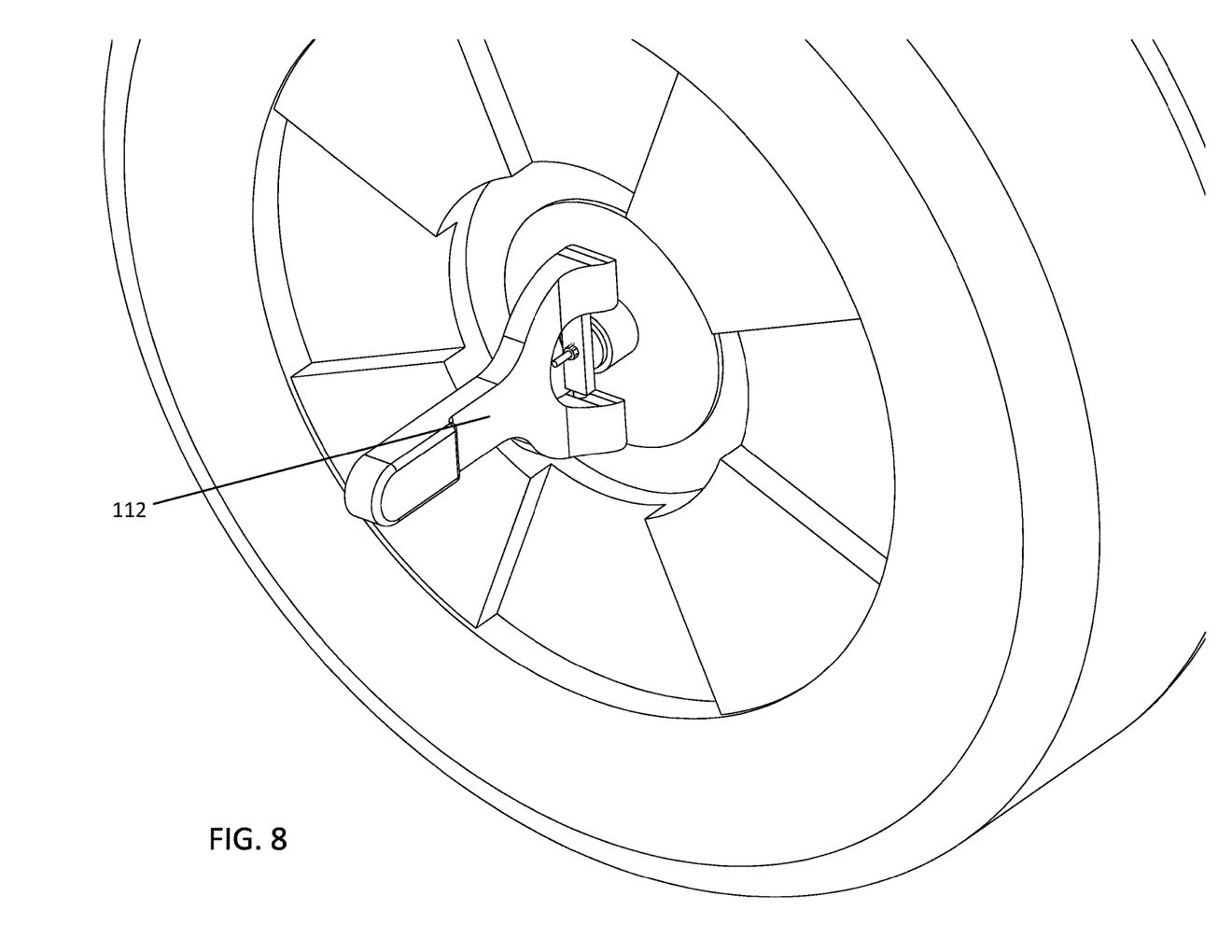
FIG. 8 is a perspective view of a brake assembly for a retractable wheel mechanism according to certain embodiments.
Figure 9:
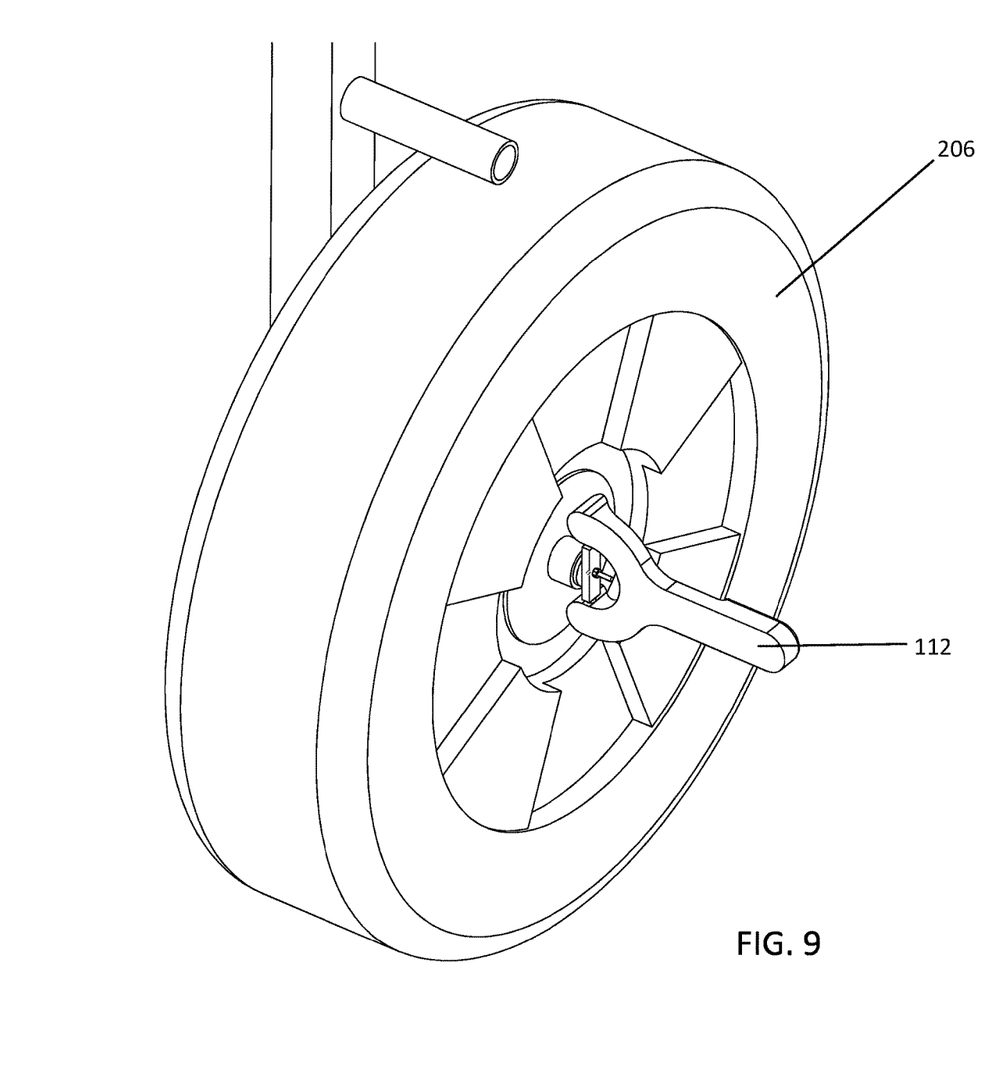
FIG. 9 is a perspective view of a brake assembly for a retractable wheel mechanism according to certain embodiments.

The body 112 of the brake member 106 can be pivoted from the engaged position to a disengaged position where the tire 206 is permitted to freely rotate. This is shown in FIGS. 7-9. The longitudinal axis of the body 112 is pivoted about the pivot member 114 until the body 112 is no longer engaged with the face of the tire, such as when the longitudinal axis of the body 112 extends along or parallel to the rotational axis of the tire 206. The plate 102 keeps the head of the brake member from damaging the tire.

The fastener 108/110 securing the brake member 106 can be provided with a spring so that the brake member 106 is held in a given position until pivoted by the user.

The tire 206 (also referred to as a wheel) is preferably formed as a single plastic molded piece. However, other materials (e.g. metal alloys and rigid composites) can be used that would be suitable to remaining at least partially submerged for extended periods of time.

The brake member 106 can be formed of a metal alloy (e.g. aluminum alloy) or a rigid composite or plastic material. The fastening hardware and axle insert can also be formed of suitable metal alloys, composites or plastics suited for the submerged environment.

The brake member 106 can be formed of various different shapes to accommodate a variety of wheel faces and engaging features.

A pin can also be provided to the tail portion of the brake member. The pin extends perpendicularly from the tail so that the pin can be inserted into the face of the tire when the brake member is pivoted into the engaged position. The wheel can be provided with a corresponding aperture to receive the pin. This arrangement provides additional means for restraining the tire from rotating. This also provides a means for the brake member 106 engaging the tire if the face of the tire is smooth so that the tail portion cannot otherwise engage the face of the tire.

In use, the user installs the retractable wheel mechanism 200 components to the boat lift or dock. The user can restrain the tire from rotating by moving the brake member into the engaged position. The user can allow the tire to rotate freely by moving the brake member into the disengaged position.

The brake mechanism described herein can be retrofit to existing retractable wheel mechanisms that employ an axle comprising a hollow tube. The brake mechanism described herein can be provided as part of a retractable wheel mechanism kit or system. The brake mechanism described herein can be provided as part of a boat lift or dock system or kit.

Other features and aspects of the invention can be appreciated from the depictions in the figures, even if not described in writing herein.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A brake assembly for a retractable wheel mechanism for boat lifts and docks, the retractable wheel mechanism including a sliding support member comprising an axle attached thereto and a tire that is disposed on the axle, the brake assembly comprising:
    a contact plate, including an aperture therethrough so that the contact plate can be disposed on the axle;
    an axle insert that is sized and shaped to fit into a hollow portion of the axle;
    a brake that is configured to be pivotally secured to the axle insert such that the brake cannot rotate about a rotational axis of the tire while allowing the brake to pivot perpendicular to a rotational axis of the tire.

2. The brake assembly of claim 1, wherein the brake comprises a pivot and a brake body defining a head portion with a gap in the head portion, wherein the pivot is disposed in the gap so that the pivot spans between opposing sides of the head portion that define the gap, and wherein the pivot is pinned through a longitudinal axis thereof so that the pivot can rotate relative to the brake body.

3. The brake assembly of claim 2, wherein the brake is fastened to the axle insert via the pivot.

4. The brake assembly of claim 2, wherein the brake is fastened to the axle insert via a fastener passing through the pivot and into the axle insert.

5. The brake assembly of claim 1, wherein the axle insert is rotationally locked to the axle.

6. The brake assembly of claim 1, wherein the axle insert is rotationally locked to the axle via a pin extending radially through the axle and through an aperture extending radially through the insert.

7. The brake assembly of claim 1, wherein the brake is Y-shaped.

8. The brake assembly of claim 1, wherein the brake comprises a head portion that is pivotally secured to the axle and an opposing tail portion that is not secured to the axle.

9. The brake assembly of claim 8, wherein, when the brake is pivoted into an engagement position, the tail portion is shaped to engage a portion of the tire such that the tire cannot rotate about the axle.

10. The brake assembly of claim 8, wherein the tail portion is an elongated bar.

11. The brake assembly of claim 8, wherein, when the brake is pivoted into an engagement position, the tail portion is rotationally captured between two projecting regions on an outer surface of the tire.

12. The brake assembly of claim 1, wherein, when the brake is pivoted into an engagement position, a portion of the brake is rotationally captured between adjacent projecting regions on an outer surface of the tire.

13. The brake assembly of claim 1, wherein, when the brake is pivoted into an engagement position, a longitudinal axis of the brake is perpendicular to an axis of rotation of the tire.

* * * * *